United States Patent [19]

Price

[11] 3,889,840

[45] June 17, 1975

[54] GAGE CONSTRUCTION AND SPACING MEMBER THEREFOR OR THE LIKE

[75] Inventor: Larry V. Price, Knoxville, Tenn.

[73] Assignee: Robertshaw Controls Company, Richmond, Va.

[22] Filed: Oct. 2, 1973

[21] Appl. No.: 402,707

[52] U.S. Cl. ............... 220/82 A; 73/431; 220/319
[51] Int. Cl. .................. B65d 25/54; G01d 11/26
[58] Field of Search......... 73/431; 220/55 AN, 82.5, 220/82 A, 82 R, 319; 267/1.5, 70; 58/90 R

[56] References Cited
UNITED STATES PATENTS

| | | | |
|---|---|---|---|
| 2,215,566 | 9/1940 | Schaaf............................ | 220/55 AN |
| 2,294,175 | 8/1942 | Graesser et al.................. | 73/431 X |
| 2,402,360 | 6/1946 | Bevins............................. | 220/82 R |
| 2,607,228 | 8/1952 | Coxon............................. | 73/431 |
| 2,697,242 | 12/1954 | Elowson et al................. | 73/431 UX |
| 3,143,885 | 8/1964 | Waite et al. ................... | 73/431 |
| 3,844,442 | 10/1974 | Puster et al..................... | 220/82 A |

*Primary Examiner*—Richard C. Queisser
*Assistant Examiner*—John S. Appleman
*Attorney, Agent, or Firm*—Candor, Candor & Tassone

[57] ABSTRACT

An instrument casing having an opening therein exposing a pointer and a dial therefor. A sealing member is carried by the casing adjacent the opening thereof. A lens is disposed in the opening and is provided with an outer periphery that is disposed against the sealing member. A lens ring is disposed against the other side of the outer periphery of the lens to hold the lens in the casing opening. The lens ring has an interlocking part thereof disposed against the outer peripheral edge of the lens between the sides thereof to lock the lens ring to the casing and, thus, the lens in the casing opening. A separate annular spacing member is disposed in the casing opening against the end wall thereof to hold the sealing member in spaced relation from the dial plate, the spacing member carrying an annular spring adapted to be compressed between the sealing member and an end wall of the casing to maintain the sealing member in sealing engagement with the lens.

8 Claims, 7 Drawing Figures

PATENTED JUN 17 1975 3,889,840

SHEET 1

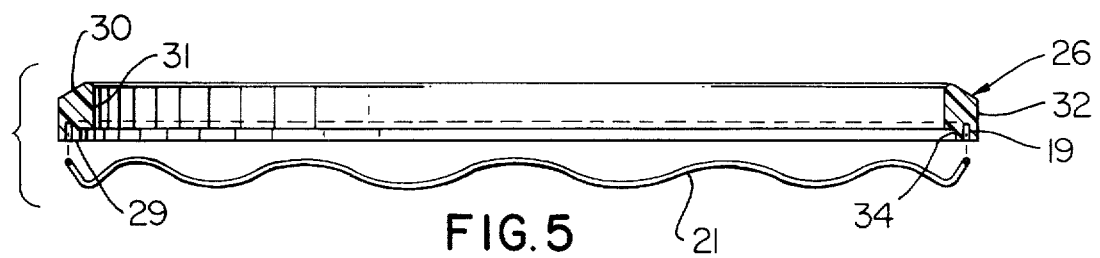
PATENTED JUN 17 1975
3,889,840
SHEET 2
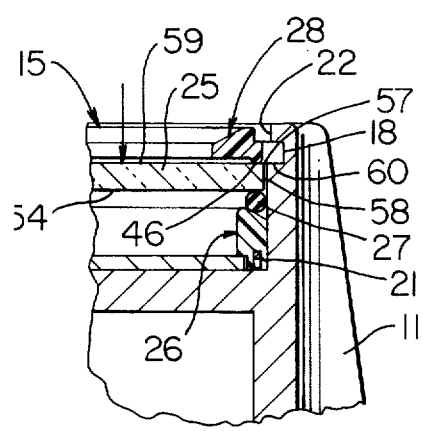
FIG.6
FIG.5
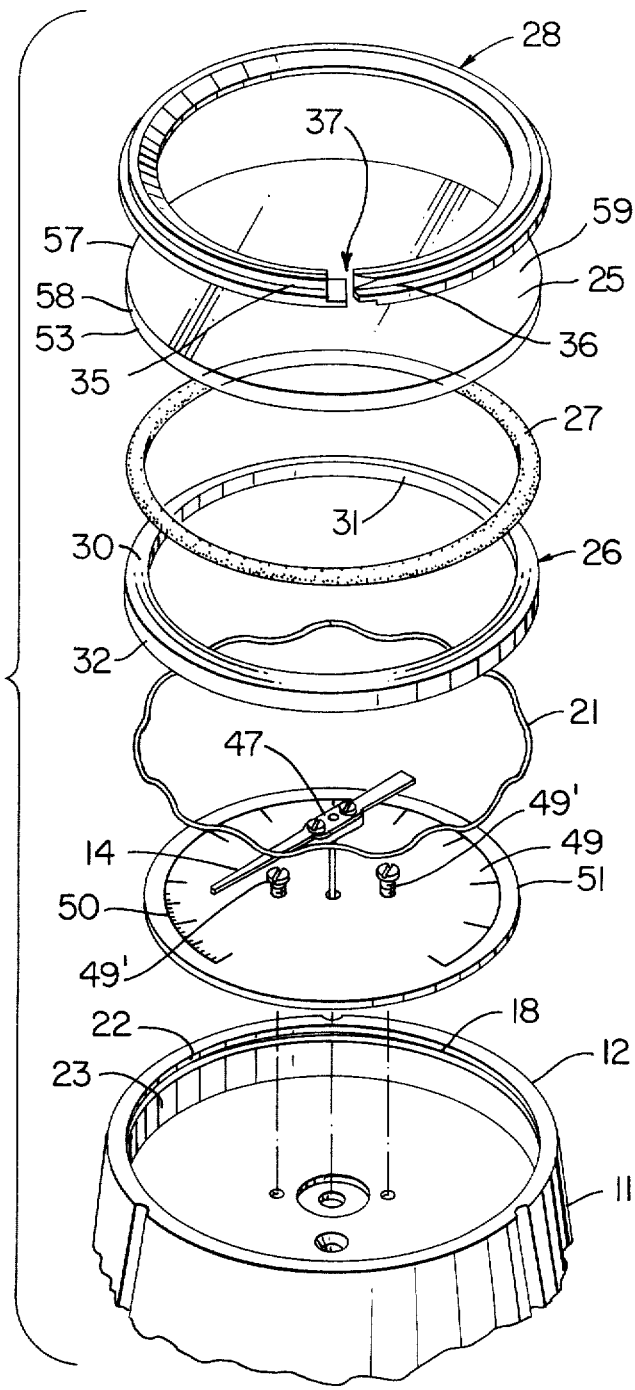
FIG.7

GAGE CONSTRUCTION AND SPACING MEMBER THEREFOR OR THE LIKE

This invention relates to an improved gage construction or the like as well as to an improved spacing member for such a gage construction or the like.

It is well known that instrument casings have been provided wherein an opening in the casing exposes a dial and pointer arrangement for indicating the particular condition being sensed by the instrument, such as in a pressure gage construction or the like. It is also well known that such opening in the casing is closed by a lens to not only protect the dial and pointer arrangement, but also to seal closed the casing opening for safety purposes, such as in connection with a pressure gage and the like.

Accordingly, it is a feature of the copending patent application, Ser. No. 290,477, filed Sept. 20, 1972, now U.S. Pat. No. 3,844,442, to provide an improved means for holding and securing the lens in the opening of the casing of an instrument or the like as well as to provide an improved lens ring means for locking the lens in the opening of an instrument casing.

However, it is a feature of this invention to provide an improved spacing means for spacing the lens in the opening of such an instrument casing or the like to not only permit unlocking of the lens ring for lens removal purposes, but also to improve upon the sealing of the lens in the casing to permit such instrument to handle pressurized fluid and the like.

In particular, one embodiment of this invention provides an instrument casing having an opening therein. A sealing member is carried by the casing adjacent the opening thereof. A lens is disposed in the opening and has one side of its outer periphery disposed against the sealing member. A lens ring means is disposed against the other side of the outer periphery of the lens to hold the lens in the opening. The lens ring means has an interlocking part thereof disposed against the outer peripheral edge means of the lens between the opposed sides thereof to lock the lens ring means to the casing and, thus, the lens to the casing. A separate spacing member is disposed in the opening and has one side thereof facing an end wall means of the casing that closes the opening thereof. The other side of the spacing member engages the sealing member to position the same above the end wall. The spacing member carries compression spring means that engages the end wall and normally spaces the spacing member from the end wall to thereby place the sealing member under compression against the lens to seal the same whereby the casing can be utilized with pressurized fluid and the like.

Accordingly, it is an object of this invention to provide an improved gage construction or the like having one or more of the novel features set forth above or hereinafter shown or described.

Another object of this invention is to provide an improved spacing means for the lens of a gage construction or the like.

Other objects, uses and advantages of this invention are apparent from reading of this description which proceeds with reference to the accompanying drawings forming a part thereof and wherein;

FIG. 5 is a cross-sectional view through the the improved lens spacer of this invention that is utilized in the gage construction of FIG. 1 and 2, the parts of the spacer being exploded.

FIG. 6 is a partial cross-sectional view similar to FIG. 2 and illustrates the method of inserting and removing the lens and lens ring means from the instrument casing.

FIG. 7 is an exploded perspective view of the various parts of the gage construction of FIGS. 1 and 2.

Figure 1:
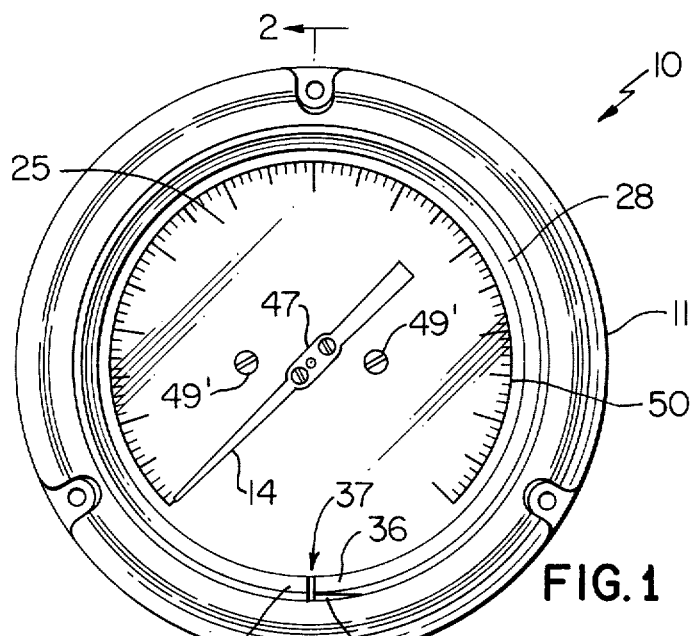
FIG. 1 is a front view of an improved gage construction of this invention.

While the various features of this invention are hereinafter described and illustrated as being particularly adapted for providing the lens holding means for a pressurized gage construction or the like, it is to be understood that the various features of this invention can be utilized singly or in any combination thereof to provide a lens arrangement for any other type of device as desired.

Therefore, this invention is not to be limited to only the embodiment illustrated in the drawings, because the drawings are merely utilized to illustrate one of the wide variety of uses of this invention.

Figure 2:
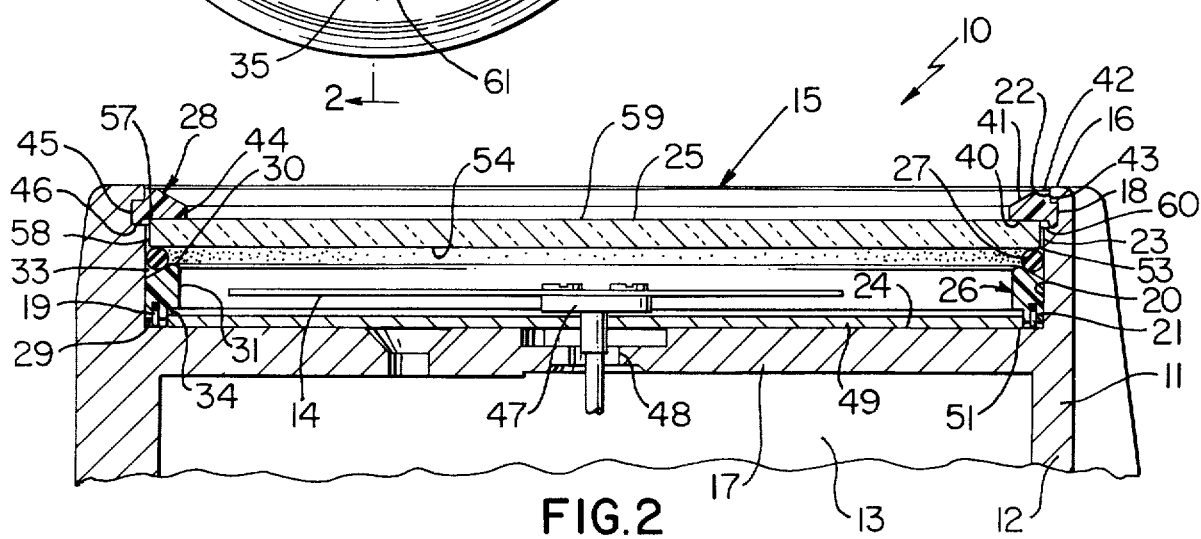
FIG. 2 is an enlarged fragmentary, cross-sectional view taken on line 2—2 of FIG. 1.

Referring now to FIGS. 1 and 2, an improved gage construction of this invention is generally indicated by the reference numeral 10 and comprises an instrument casing 11 having a body portion 12 provided with a chamber 13 therein for receiving conventional motion transmitting means that is adapted to operate and move a rotatably mounted pointer 14 in response to a sensed condition in a manner well known in the art whereby such motion transmitting means need not be illustrated nor further described.

The instrument casing 11 has an opening 15 formed therein and interrupting an end surface 16 thereof, the opening 15 being substantially circular and cylindrical and defining a substantially flat circular end wall 17, substantially closing off the opening 15 and separating the same from the motion transmitting chamber 13. The opening 15 is formed in such a manner that the same defines an annular groove 18 in the internal peripheral sidewall 20 of the casing 11 that defines the cylindrical opening 15.

The annular groove 18 is formed in such a manner that the same defines an outwardly directed annular shoulder 22 adjacent the end surface 16 of the casing 11 and an annular shoulder 23 between the groove 18 and the upper flat surface 24 of the end wall 17.

The lens closing arrangement for the opening 15 of the casing 11 comprises a transparent, disc-like lens 25, a separate annular spacing member 26, an annular sealing member 27 and an annular lens ring means 28.

The annular spacing member 26 of this invention is best illustrated in FIG. 5 and can be formed of molded plastic material or other suitable material having the cross-sectional configuration illustrated wherein the annular sealing member 26 has opposed sides or ends 29 and 30 and a substantially cylindrically shaped internal peripheral surface 32. The upper end surface 30 is angled between the internal and external peripheral surfaces 31 and 32 thereof whereas the lower end surface 29 is provided with an annular recess 34 at the inner peripheral edge thereof.

The lower end surface 29 of the spacing member 26 is provided with an annular groove 19 outboard of the annular recess 34, the groove 19 being adapted to receive an annular wavy wire spring 21 that normally projects out of the groove 19 beyond the end of surface 29 of the spacing member 26 for a purpose hereinafter described.

Figure 3:
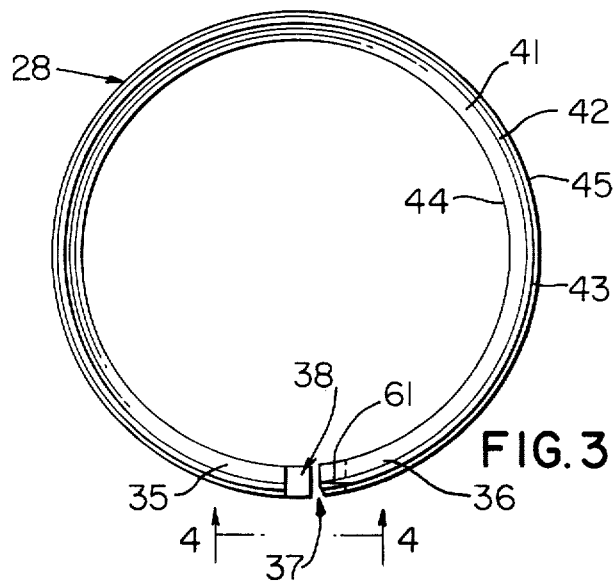
FIG. 3 is a front view of the lens ring means of the gage construction before the same is inserted therein.
Figure 4:
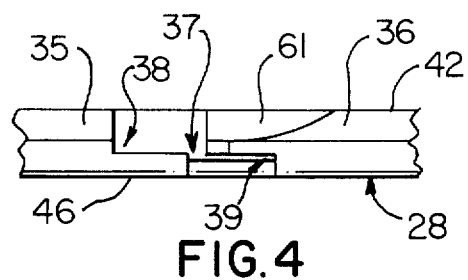
FIG. 4 is an enlarged, fragmentary, side view of the opposed ends of the lens ring means of FIG. 3 and is taken substantially in a direction of the arrows 4—4 of FIG. 3.

The annular lens ring means 28 as illustrated in FIGS. 2, 3 and 4 comprises a split member having ends 35 and 36 that define a split 37 therebetween, the ends 35 and 36 respectively provided with cut-out portions 38 and 39 which will permit the ends 35 and 36 to be moved toward each other in overlapping relation without increasing the thickness of the annular ring means 28 at the split 37 thereof.

The annular lens ring means 28 has a cross-sectional configuration to define a lower flat surface 40 thereof and an upper beveled surface 41 that joins with an annular top flat surface 42 that is interrupted at the outer peripheral edge thereof by an annular recess 43. The annular lens ring means 28 has a substantially cylindrically shaped internal peripheral side 44 and a substantially cylindrically shaped outer peripheral side 45. A depending annular locking bead 46 extends from the lower surface 40 of the annular lens ring means 28 adjacent the outer peripheral edge thereof for a purpose hereinafter described.

The pointer 14 for the gage construction 10 has a central hub portion 47 for rotatably mounting the pointer 14 in a central opening 48 of the end wall 17.

A dial plate 49 is disposed about the hub 47 of the pointer 14 and can engage against the top surface 24 of the end wall 17 in the manner illustrated in FIG. 2 to be fastened thereto by fastening means 49', the dial plate 49 having suitable markings 50 thereon in the manner illustrated in FIG. 1 in a conventional manner whereby the movement of the pointer 14 relative to the markings 50 privides a visual indication through the lens 25 as to the condition being sensed by the gage construction 10 or the like.

The method of utilizing the spacer 26, sealing member 27, lens 25 and lens locking ring means 28 of this invention will now be described.

After the instrument casing 11 has been provided with the pointer and dial arrangement 14, 49, the annular spacer 26 is slipped through the opening 15 so that the parts of the wavy spring 21 that extend beyond the lower side 29 thereof rest against the upper surface 24 of the end wall 17, the recess 34 in the inner peripheral edge thereof receiving the outer peripheral edge 51 of the dial plate 49 as illustrated. Since the spacer 26 is not an integral part of the casing 11 and is disposed in the opening 15 after the dial plate 49 has been disposed in place, it can be seen that the diameter of the dial plate 49 can be larger than if the spacer 26 was an integral part of the casing 11 where the dial plate 49 would have to have clearance in order to pass through the internal peripheral surface 31 of the spacer 26. This clearance requirement is eliminated by the use of a dial plate 49 having a diameter larger than the inside diameter of the spacer 26 at the surface 31 thereof whereby the spacer 26 covers the outer unused portion of the dial plate 49 as illustrated in FIGS. 1 and 2.

With the spacer 26 now in place, it can be seen that the angled top surface 30 defines a recess 33 at the upper outer peripheral edge thereof that cooperates with the shoulder 23 to receive the annular sealing member 27 that can be placed therein as illustrated in FIG. 2. Thus, the sealing member 27 can be formed of any suitable resilient material for the high pressure sealing purpose hereinafter described, such as being a conventional O-ring seal for the lens 25.

After the sealing member or gasket 27 has been disposed in the recess 33 in the manner illustrated in FIG. 2, the lens 25 is slipped through the opening 15 so as to have the outer peripheral portion 53 of the lower side 54 thereof rest against the upper surface of the sealing member 27 as illustrated. Without any downward force on the lens 25, the natural resiliency of the wavy spring 21 is to position the lens 25 relative to the annular shoulder 20 in such a manner that the upper part 57 of the side edge means 58 of the lens 25 closes off the lower part of the groove 18 as illustrated in FIG. 2.

After the lens 25 has been placed in the opening 15, the lens ring means 28 which is molded with a normally slightly larger diameter than the opening 15 of the case 11 at the shoulder 22 thereof is laid against the upper surface 59 of the lens 25 with the split 37 being located at what will be the bottom of the casing 11 in the manner illustrated in FIG. 1. Beginning with the end 35 of the lens ring means 28, and by pressing on the upper surface 59 of the lens 25 so as to compress the wavy spring 21 and thereby permit the upper surface 59 of the lens 25 to become parallel with the lower edge 60 that defines the bottom of the groove 18 as illustrated in FIG. 6, the lens ring means 28 is pressed outwardly into the groove 18 and the bead 46 on the lens ring means 28 passes over the outer peripheral edge 58 of the lens 25 and snaps into place allowing the lens 25 and wavy spring 21 to take their final up position as illustrated in FIG. 2 by the wavy spring 21 reexpanding and locking the lens ring means 28 in place as well as locking the lens 25 in the opening 15 of the casing 11. Also, the final compressed condition of the wavy spring 21 continuously urges the sealing member 27 into sealing engagement with the underside 54 of the lens 25 even after the sealing member 27 has taken a permanent set.

As the lens ring means 28 is being disposed in the groove 18, its original larger diameter tends to hold the lens ring means 28 more securely in the groove 18 of the casing 11 and the gap or split 37 between the ends 35 and 36 thereof remains even though the ends 35 and 36 are now disposed in overlapping relation to compensate for temperature variations when the casing 11 has a different coefficient of expansion and contraction than the ring means 28. However, the gap or split 37 is of minimum though sufficient width when the one end 36 of the lens ring means 28 overlaps the other end 35 in the manner illustrated in FIG. 1 so that the lens 25 is not visible through the gap 37 when viewing the front of the gage 10.

Thus, it can be seen that the annular bead 46 on the lens ring means 28 locks the ring means 28 into the cavity formed by the upper part 57 of the lens edge 58 in its closing off of the lower part of the groove 18 so that the lens ring means 28 cannot be dislodged by vibration, shock, temperature vibration, etc., once the lens ring means 28 has been installed.

However, removal of the lens ring means 28 is accomplished in reverse order of installation thereof by prying with a screwdriver or similar tool between the ring means 28 and casing 11. The initial installation of such screwdriver is made easier by a chamfer 61 on the end 36 of the ring means 28 which overlaps the other end 35. Thus, by again pressing against the lens 25 to compress the wavy spring 21 removal of the lens ring means 28 is easier and reduces wear on the bead 46 which locks the ring means 28 in place.

It can be seen that by making the spacing member 26 separate from the casing 11, not only does the spacing member 26 have all of the advantages of the separate spacing member of the aforementioned patent application, but also the separate spacing member 26 of this invention provides a compressive force to maintain the seal of the seal member 27 to the lens 25 so that the gage 10 can be utilized as a pressure gage while still permitting locking and unlocking of the lens ring means 28.

Therefore, it can be seen that this invention not only provides an improved instrument construction or the like, but also this invention provides an improved spacer means for the lens of an instrument casing or the like.

While the form of the invention now preferred has been disclosed and described as required by the Patent Statutes, it is to be understood that other forms may be utilized and all come within the scope of the appended claims.

What is claimed is:

1. In combination, an instrument casing having an end wall means and an opening therein leading to said end wall means, a sealing member carried by said casing adjacent said opening thereof, a lens disposed in said opening and having one side of its outer periphery disposed against said sealing member, a lens ring means disposed against the other side of the outer periphery of said lens to hold said lens in said opening, said lens ring means having an interlocking part thereof disposed against the outer peripheral edge means of said lens between said sides thereof to lock said lens ring means to said casing, and a spacing member in said opening between said sealing member and said end wall means, said spacing member carrying a compression spring means that engages said end wall means to normally hold said spacing member from said end wall means while permitting said spacing member to be moved toward said end wall means through the compressing of said compression spring means whereby said compression spring is adapted to be compressed and cause said spacing member to maintain said sealing member in sealing engagement with said one side of said lens.

2. In combination, an instrument casing having an end wall means and an opening therein leading to said end wall means, a sealing member carried by said casing adjacent said opening thereof, a lens disposed in said opening and having one side of its outer periphery disposed against said sealing member, a lens ring means disposed against the other side of the outer periphery of said lens to hold said lens in said opening, said lens ring means having an interlocking part thereof disposed against the outer peripheral edge means of said lens between said sides thereof to lock said lens ring means to said casing, and a spacing member in said opening between said sealing member and said end wall means, said spacing member having an annular groove means therein that faces said end wall means, and a wavy spring disposed in said annular groove means and being in engagement with said end wall means to normally hold said spacing member spaced from said end wall means while permitting said spacing member to be moved toward said end wall means through the compressing of said wavy spring whereby said spring is adapted to be compressed and cause said spacing member to maintain said sealing member in sealing engagement with said one side of said lens.

3. A spacing member for being disposed in an opening of an instrument casing to space a lens from an end wall means of the casing, said spacing member carrying compression spring means that is adapted to engage said end wall means and normally space said spacing member from said end wall means while permitting said spacing member to be moved toward said end wall means through the compression of said compression spring means, said spacing member being substantially annular, said spacing member having a substantially annular groove means therein receiving said compression spring means.

4. A spacing member as set forth in claim 3 wherein said compression spring means comprises a substantially annular wavy spring.

5. A spacing member as set forth in claim 3 wherein said spacing member has a top surface that is angled to cooperate with said casing for defining a groove means to receive an annular sealing member between said spacing member and said lens.

6. A spacing member for being disposed in an opening of an instrument casing to space a lens from an end wall means of the casing, said spacing member carrying compression spring means that is adapted to engage said end wall means and normally space said spacing member from said end wall means while permitting said spacing member to be moved toward said end wall means through the compression of said compression spring means, said spacing member being substantially annular, one side of said spacing member that is adapted to face said end wall means of said casing having an annular recess that is adapted to receive an outer peripheral portion of a dial plate therein.

7. A spacing member as set forth in claim 6 wherein said one side of said spacing member has an annular groove means therein outboard of said annular recess and receiving said compression spring means therein.

8. A spacing member as set forth in claim 7 wherein said compression spring means comprises a substantially annular wavy spring.

* * * * *